Aug. 6, 1957     E. D. DALL     2,801,780
SPARE WHEEL MOUNT AND ANTI-RATTLE MEANS
Filed May 14, 1953     3 Sheets-Sheet 1

Inventor
Edward D. Dall

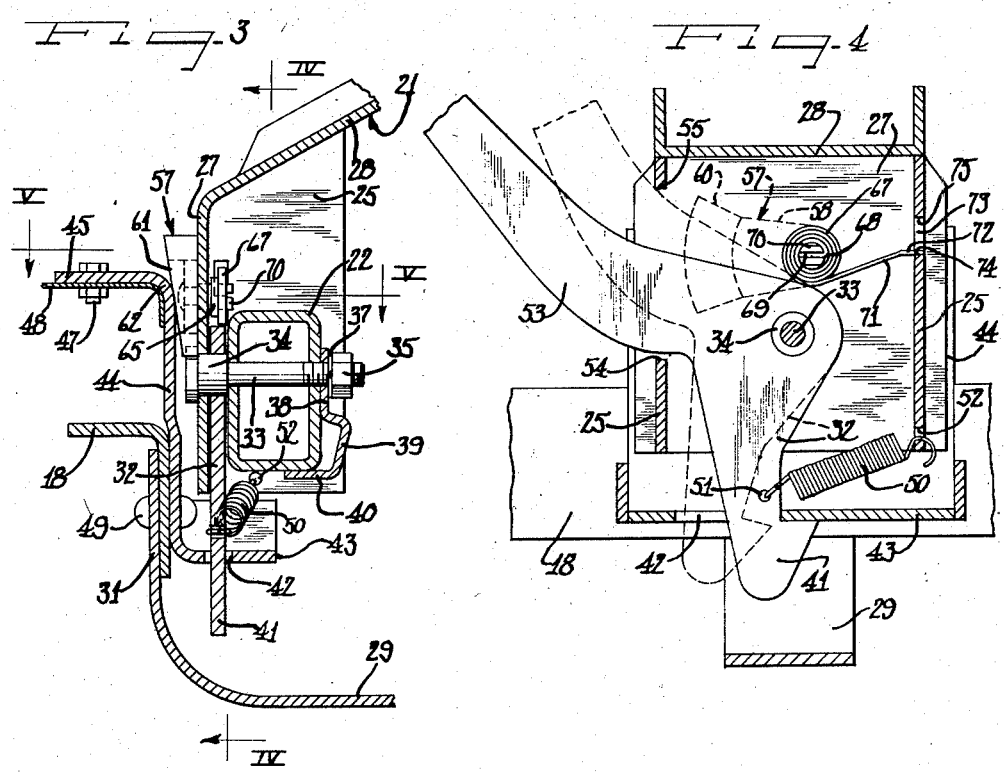

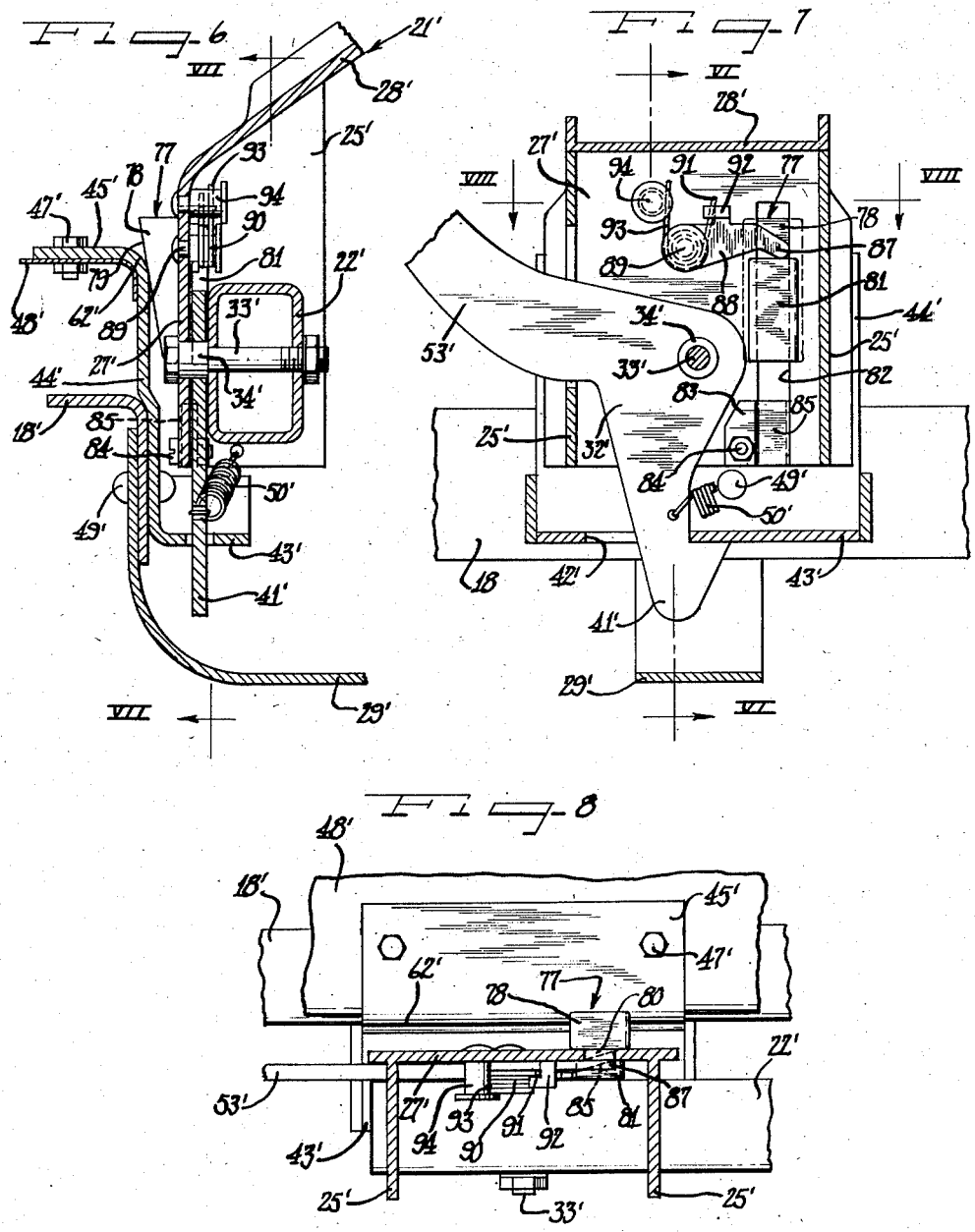

United States Patent Office 2,801,780
Patented Aug. 6, 1957

2,801,780
SPARE WHEEL MOUNT AND ANTI-RATTLE MEANS

Edward D. Dall, Birmingham, Mich., assignor to Houdaille Industries, Inc., a corporation of Michigan Application May 14, 1953, Serial No. 354,989

5 Claims. (Cl. 224—42.21)

The present invention relates to improvements in spare wheel mounts for automobiles and more particularly concerns improvements in such spare wheel mounts to overcome looseness that may produce vibrations or rattling in service.

An important object of the present invention is to provide a spare wheel mount for automobiles wherein relative movement between certain parts which might lead to vibrations or rattling in service is effectively countered.

Another object of the invention is to provide in a spare wheel mount for automobiles novel anti-rattle means.

A further object of the invention is to provide novel means for preventing relative movement between parts of a spare wheel mount.

Still another object of the invention is to provide a novel yieldable wedge structure operable to avoid vibratory or rattling movements of a spare wheel mount or supporting structure and a fixed portion of a vehicle in the service aspects of the supporting structure.

A still further object of the invention is to provide a self-equalizing rattle-preventing wedge arrangement for spare wheel mounts.

Other objects, features and advantages of the present invention will be readily apparent from the following detailed description of certain preferred embodiments thereof taken in conjunction with the accompanying drawings in which:

Figure 3 is an enlarged fragmentary sectional detail view taken substantially on the line III—III of Figure 1;

Figure 4 is a fragmentary vertical sectional detail view taken substantially on the line IV—IV of Figure 3;

Figure 5 is a vertical sectional fragmentary detail view taken substantially on the line V—V of Figure 3;

Figure 6 is a fragmentary vertical sectional detail view of a modification taken substantially on the line VI—VI of Figure 7;

Figure 7 is a fragmentary vertical sectional detail view taken substantially along the line VII—VII of Figure 6; and Figure 8 is a horizontal fragmentary sectional detail view taken substantially on the line VIII—VIII of Figure 7.

Figures 1, 2:
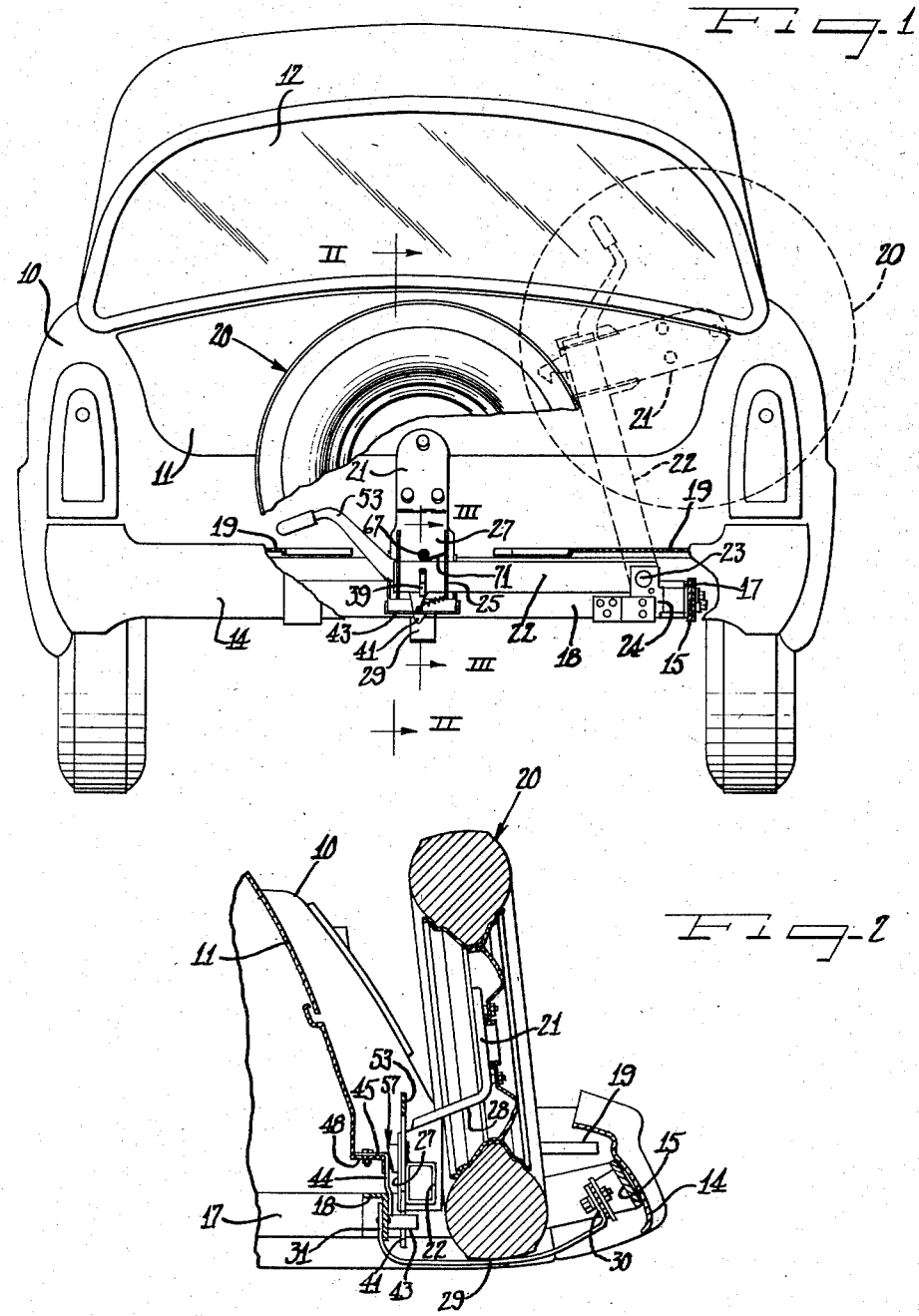
Figure 1 is a more or less schematic rear elevational view of an automobile having mounted thereon a spare wheel supporting structure embodying features of the invention.
Figure 2 is a fragmentary vertical sectional view taken substantially on the line II—II of Figure 1.

By way of example, the present invention is shown as applied to an automobile 10 having in the rear portion thereof a luggage compartment deck closed by an upwardly swinging door 11 below a rear window 12. Supported in rearwardly spaced relation behind the lower portion of the automobile body 10 is an ornamental and protective bumper 14 carried at least in part by a generally U-shaped frame bracket bar 15 suitably secured to the under frame of the automobile body, comprising longitudinally extending side frame bars 17 and a transversely extending rear frame bar 18. A gravel guard plate structure 19 is mounted between the bumper 14 and the rear portion of the automobile body.

A spare wheel 20 is detachably mounted upon a spare wheel supporting bracket 21 carried by the free end portion of a vertically swingable spare wheel mount arm 22 secured to a rotary rock shaft 23. Support for the rock shaft is provided by a bracket structure 24 carried by the under frame members 17, 18 of the automobile. Through this arrangement the spare wheel 20 can be moved into and out of normal service position centered behind the automobile as shown in full outline in Figures 1 and 2. When it is desired to gain access to the trunk compartment through the door 11, the spare wheel 20 is adapted to be swung upwardly and laterally toward one side of the automobile, as shown in dash outline in Figure 1. Appropriate clearance is afforded through the gravel guard structure 19 for the spare wheel and the spare wheel mount arm 22.

For lightness in weight with adequate rigidity, the swingably supported spare wheel mount arm 22 is preferably constructed as a hollow tube of substantially rectangular cross section and the arm is disposed operatively forwardly of the spare wheel 20 adjacent to the rear extremity of the automobile body 10.

Rigid attachment of the wheel supporting bracket plate 21 to the arm 22 is suitably effected through the medium of a pair of spaced upright reenforcing and attachment plate members 25 which are secured fixedly as by means of welding to a lower flange portion 27 of the bracket plate and to an overhanging rearwardly and upwardly sloping intermediate offsetting portion 28 of the plate. The arm 22 extends through appropriate aligned apertures in the lower portions of the spaced parallel plate flanges 25.

In its lowered, service position, the pneumatic tire of the spare wheel assembly 20 rests upon a supporting strap member 29 underlying the same in a front to rear direction and having a front upwardly extending attachment flange 30 secured in suitable fashion to the supporting bracket 15. An upwardly extending terminal flange 31 at the forward end portion of the strap member 29 is suitably secured to the frame bar 18.

To prevent the spare wheel from bouncing up from the supporting strap bar 29 in the operation of the vehicle, a releasable latch is provided comprising a depending plate latch arm 32 pivotally mounted on a bearing shaft member 33 in the form of a bolt extending through appropriate aligned apertures in the arm 22 and the bracket plate flange 27 so that the latch member 32 is rockable in the space between the rear face of the flange 27 and the front adjacent face of the bar 22. An enlarged bearing collar 34 on the bolt 33 bears against the front face of the bar 22 and provides a bearing for the latch 32. At its rear threaded end portion the bolt 33 projects rearwardly beyond the bar 22 and has secured thereto a retaining nut 35 bearing against a lock washer 37 which in turn engages against a tensioning arm 38 of a resilient tensioning member 39 interposed between the lock washer 37 and the rear face of the bar 22. A lower forwardly directed attachment flange 40 of the tensioning member is secured as by welding to the under face of the bar 22. Normally the spring tensioning arm 38 tends to spring rearwardly away from the bar 22 but is drawn up tight thereagainst by means of the nut 35 and thus resists loosening of the nut or rattling of the parts should any looseness develop in the elements cooperatively related therewith.

On its lower end portion, the latch member 32 is provided with a latch hook 41 engageable through a clearance slot 42 in a horizontal rearwardly extending keeper flange 43 underlying the latch member. The keeper flange 43 comprises an integral portion of a bracket member 44 having a generally vertically extending body portion provided with an upper forwardly directed attachment flange 45 secured as by means of a bolt 47 to a flange portion 48 of the vehicle body below the access door 11 (Figures 2 and 3). The lower portion of the body of the bracket member 44 may be secured to the transverse frame bar 18, together with the flange 31 of the wheel support bar by suitable means such as rivets 49.

The latch member 32 is normally biased counterclockwise as viewed in Figure 4 by means of a coiled tension spring 50 having one end portion thereof hooked through an aperture 51 in the latch member 32 and the opposite end portion hooked through an anchoring aperture 52 in the lower right hand reenforcing plate 25. Thereby when the latch hook 41 is extended through the keeper slot 42, the hook will engage under the keeper flange 43 at the right hand end of the slot 42.

For releasing the latch 32, a bell crank lever handle 53 is provided thereon extending through a vertical clearance slot 54 in the left hand reenforcing plate 25. When it is desired to swing the spare wheel 20 into the out of the way position, the handle 53 is lifted, thereby releasing the latch 32 and moving the upper edge of the arm 53 against a stop shoulder 55 defining the upper end of the slot 54 and the spare wheel can thus be lifted up to be swung about the axis of the rock shaft 23. When the spare wheel and its mount are swung back to the service position, the latch 32 automatically re-engages with the keeper 43 as the spare wheel tire comes to rest against the supporting bar 29.

By having the latch 32 and the supporting bar 29 properly correlated, fairly firm pressure of the tire against the supporting bar 29 can be maintained and thus any bouncing of the spare wheel during operation of the vehicle is substantially prevented.

In view of the substantial length of the mount bar 22, and the desirable tolerances in the mechanism, and more especially a spaced relation between the front of the bracket flange 27 and the opposing generally vertically extending body of the keeper bracket 44 for operating clearance, there may be a tendency for the spare wheel to vibrate with rattling or chattering effect in the operation of the vehicle. Accordingly, means are provided for tightening the mount assembly against undesirable fore and aft movement, herein comprising a member 57 engageable in slack take up or tightening relation between the wheel mount bracket flange 27 and the opposing generally upright body portion 44 of the keeper bracket. Herein, the slack eliminator 57 comprises a self-adjusting wedge member that becomes operative automatically as an incident to movement of the wheel mount into service position.

In a preferred form, the wedge member 57 comprises a flattened, somewhat elongated plate-like body having one end portion thereof attached to a pivot member 59 while the opposite, distal end portion of the wedge member comprises a wedging head 60 coplanar at its rear side with the wedge member body 58 and projecting to a substantially thickened offset relation to the body 58 at the forward side to provide a downwardly and rearwardly sloping cam-like wedging face 61. By preference, the face 61 also slopes from the end extremity of the head 60 toward juncture with the forward flat face of the body 58. In addition, as best visualized in Figure 4, the wedge head 60 is preferably of fan-like flaring or segmental form.

Operative location of the wedging device 57 is such that in the service position of the spare wheel mount, the wedge face 61 cammingly engages operatively against the upper end portion of the bracket body 44 which is supported more or less rigidly upon the rear end portion of the vehicle body 10. By preference coaction of the wedging face 61 is directly with a more or less cam-like surface 62 provided at juncture of the bracket body 44 with the forward attachment flange 45 of the bracket. This is effective to take up or occupy the slack between the bracket and the mount flange 27 by interposing the solid head 60 between the bracket and the forward face of the flange 27 against which the rear face of the member 57 is preferably slidably engaged.

By having the wedging member 57 pivotally mounted on the flange 27 compensation or tolerance for variables in relative vertical disposition of the spare wheel mount relative to the bracket body 44 is accommodated. This pivotal mounting is accomplished by having the pivot member 59 in the form of a stud that is pivotally journaled in an aperture 63 in the flange 27 and with the body 58 of the wedge member secured to a riveted extremity reduced diameter portion 64 projecting forwardly from the journaled portion of the stud. On its rear end portion the stud 59 has an enlarged retaining collar 65 opposing the rear face of the flange 27 to hold the wedge member assembly against forward displacement. Thereby, by having the wedge member 57 directed toward the left side, that is toward the distal end of the spare wheel mount arm 22 efficient, automatic engagement of the wedging face 61 with the shoulder 62 of the stationary bracket occurs as an incident to the final phase of movement of the spare wheel mount into service position.

Means are provided for holding the wedge member 57 generally extended leftward in the ready position during non-operating intervals when the spare wheel mount has been lifted to the out-of-the-way position indicated in dash outline in Figure 1, and for placing the wedging device under resilient bias in the operating condition thereof to resist displacement from such position as an incident to service jarring and jostling of the vehicle body. To this end a flat spiral spring member 67 is provided having a central diametrical terminal flange 68 anchored in a transverse rearwardly opening slot 69 formed in a rearward central anchoring projection or boss 70 on the stud member 59. The spiral coils of the spring 67 are disposed in encircling relation about the boss 70 and a tangential attachment arm 71 projects from the outer coil of the spring and has a terminal flange 72 extending through a vertically elongated aperture 73 in the right hand reenforcing flange 25 of the spare wheel mounting bracket. At its lower end the aperture 73 provides an upwardly facing shoulder 74 against which the terminal flange 72 engages in the operating condition of the wedge assembly, while the upper end of the aperture 73 provides a downwardly facing shoulder 75 against which the terminal flange 72 may engage in the non-operating condition of the wedge assembly. The construction and relationship of the biasing spring 67 is such that in the operating condition of the wedge assembly, with the spring terminal 72 engaging the shoulder 74, light biasing tension is afforded for the wedge member 57 by virtue of moderate torsional tensioning of the coils of the spring 67. In the non-operating condition of wedge assembly, the limited clearance afforded by the slot 73 between the shoulders 74 and 75 enables limited loose swinging of the wedge member 57, with downward swinging thereof limited by engagement of the terminal flange 72 with the stop shoulder 75 and upward swinging limited by engagement of the stop shoulder 74 by the flange 72.

As the spare wheel mount is swung down from the out-of-the-way position indicated in dash outline in Figure 1 toward the full line position, engagement of the wedge face 61 with the shoulder 62 occurs slightly in advance of final latched service position of the spare wheel mount. As the spare wheel mount is moved in the final increment toward the latched service position, the wedge member 57 is pivoted while engaging the shoulder 62 until the spring 67 is placed under tension in the final latched position of the mount. As a result, a positive wedging action is effected by the wedge member 57 between the mount flange 27 and the adjacent bracket shoulder 62. Any tendency toward vibration of the mount relative to the vehicle body is thus counteracted. If the wedge member has engaged the shoulder 62 relatively loosely as first disposed, vibrations that may occur in operation of the vehicle will cause the wedge member to drive more firmly into wedging relation by virtue of the resilient bias afforded by the spring 67.

In the modification shown in Figures 6, 7 and 8, a yieldable wedging device 77 is employed that is reciprocably slidably guided instead of swingably disposed. Since the wedge device 77 is adapted to a spare wheel mount which in most respects is identical with the spare wheel mount shown in Figures 1 through 5, similar but primed reference numerals are employed to identify identical parts and the description of such parts given in connection with the first form of the invention apply equally in this modified form.

In the present instance, the wedge member 77 comprises a body block having a wedge portion 78 provided with a wedge cam face 79 sloping downwardly and rearwardly from a part of the upper portion and engageable wedgingly with the shoulder 62' of the keeper bracket body 44'. The back of the wedge member portion 78 is engageable slidably with the forward face of the flange 27' and is connected by a narrow vertical integral connecting web 80 with a vertically extending rear guide portion 81, which opposes the rear face of the flange 27'. The portions 78 and 81 thus provide opposite side parallel grooves in guided engagement at respective opposite sides of a vertical clearance slot 82 just wide enough to accommodate the connecting web 80. To enable assembly of the wedge device 77 with the flange 27', the lower end of the slot 82 opens through the lower edge of the flange and a retainer and stop plate member 83 is secured as by means of a bolt 84 to the inside of the lower portion of the flange 27' and has an angled flange portion 85 extending into the slot 82 so as to block downward displacement of the wedge member 77 from the slot. The upper edge of the flange 85 is disposed at a convenient elevation below the normal operating elevation of the lower end of the wedge member for clearance purposes in operation but engageable by the lower end portion of the wedge member in the non-operating condition of the wedge member.

For normally biasing the wedge member 77 downwardly for positive driving of the wedge portion 78 and thus the wedging face 79 against the shoulder 62' a thrust finger 87 engages the upper end portion of the wedge member rear portion 81. Herein the thrust finger 87 is provided as the distal end portion of a rocker arm 88 which is pivotally mounted on a stud 89 secured to the flange 27'. Yieldable resilient bias for the arm 88 tending to swing the same about its pivot 89 to drive the finger 87 downwardly against the wedge member portion 81, is afforded by a coiled torsion spring 90 having one arm 91 engaging a retaining boss arm 92 on the upper portion of the arm 88 and an opposite arm 93 of the spring engaging a stud 94 secured to the flange 27' above and to the left of the stud 89. The spring 90 is maintained under reasonable torision load normally to urge the arm 88 yieldably clockwise as viewed in Figure 7.

In the raised or out-of-the-way position of the spare tire mount, the wedge member 77 is urged downwardly by the spring bias arm 88 and rests against the stop flange 85. As the spare wheel mount is brought toward the operative service position thereof, the wedge face 79 engages the shoulder 62' and in the further movement of the spare wheel mount toward final latched position the wedge member 77 is held by its engagement with the shoulder 62', and the spring 90 is loaded as the arm 88 is swung counterclockwise incident to lowering of the flange 27' relative to the wedge member guided vertically within the slot 82. The yieldable bias urging the wedge member 77 in the wedging direction assures that all looseness tending toward vibration or chattering of the spare wheel mount during operation of the vehicle will be eliminated since in the presence of jarring or tendency toward vibration the wedge member under its resilient bias seeks a firmer wedging coaction between the flange 27' and the shoulder 62'.

Both of the wedge members 57 and 77 are preferably made from a non-corroding, non-sticking material. Excellent results have been obtained from a synthetic plastic material such as nylon. This material has, in addition to the desirable qualities above mentioned, freedom from wear due to abrasion and a self-lubricating characteristic.

It will be understood that modifications and variations may be effected without departing from the scope of the novel concepts of the present invention.

I claim as my invention:

1. In combination in a spare wheel mount, an arm mounted for swinging movement into and out of service position and having at its distal portion a bracket for supporting a spare wheel, a member disposed in stationary spaced relation to the position occupied by said bracket in the service position of the arm, and a wedge member interposed in self adjustable relatively displaceably movable wedging relation between said bracket and said stationary member for retaining the bracket against vibratory movements relative to said stationary member.

2. In combination in a spare wheel mount for vehicles, relatively movable members one of which is equipped to support a spare wheel, said members being disposable in spaced adjacency in the service relationship of the members, and a normally wedgingly biased adjustably displaceable wedge carried by one of said members and engageable with the other of said members in the service relationship by the members for retaining said members against relative vibratory movements.

3. In a spare wheel mount, a stationary member, a spare wheel supporting member movable relative to the stationary member, said members being related in spaced adjacency in the service condition thereof, a vibration preventing device comprising a displaceable wedge carried by one of said members and engageable with the other of said members in the space therebetween, and biasing means normally urging the wedge firmly into wedging relation between the members.

4. In a spare wheel mount construction, a spare wheel supporting member, a stationary member, a portion of said stationary member being disposed in spaced adjacency to the spare wheel supporting member in the service relationship of the members, and a pivotally rockable wedge member carried by the spare wheel supporting member and rockably and wedgingly engageable in vibration preventing relation with said portion of the stationary member in the service relationship of the members.

5. In a spare wheel mount construction, a spare wheel supporting member, a stationary member, said spare wheel supporting member being movable into and out of service relation to said stationary member, and a vibration preventing wedging device carried by said spare wheel supporting member including a reciprocably displaceably movable wedge engageable reciprocably, displaceably and wedgingly with the stationary member in the service relationship of the members, and biasing means normally urging the wedge firmly into wedging relation between the members.

References Cited in the file of this patent

UNITED STATES PATENTS

| | | |
|---|---|---|
| 1,689,148 | McCloud | Oct. 23, 1928 |
| 1,689,149 | McCloud | Oct. 23, 1928 |
| 1,808,983 | Hebeler | June 9, 1931 |
| 2,620,105 | Erickson | Dec. 2, 1950 |
| 2,553,686 | Stromberg | May 22, 1951 |
| 2,711,273 | Stromberg | June 21, 1955 |
| 2,733,847 | Pyes | Feb. 7, 1956 |